US007794638B2

(12) United States Patent
Clune

(10) Patent No.: US 7,794,638 B2
(45) Date of Patent: Sep. 14, 2010

(54) TRANSFERRING RESIN FOR FORMING FASTENER PRODUCTS

(75) Inventor: William P. Clune, Hillsborough, NH (US)

(73) Assignee: Velcro Industries B.V., Curacao (AN)

(*) Notice: Subject to any disclaimer, the term of this patent is extended or adjusted under 35 U.S.C. 154(b) by 359 days.

(21) Appl. No.: 10/592,841

(22) PCT Filed: Mar. 10, 2005

(86) PCT No.: PCT/US2005/007646

§ 371 (c)(1), (2), (4) Date: Jul. 15, 2008

(87) PCT Pub. No.: WO2005/090045

PCT Pub. Date: Sep. 29, 2005

(65) Prior Publication Data

US 2008/0272512 A1     Nov. 6, 2008

Related U.S. Application Data

(60) Provisional application No. 60/554,234, filed on Mar. 18, 2004.

(51) Int. Cl.
*B29C 39/20* (2006.01)

(52) U.S. Cl. .................................................. 264/173.1
(58) Field of Classification Search .............. 264/173.1; 118/249
See application file for complete search history.

(56) References Cited

U.S. PATENT DOCUMENTS

| 1,600,509 | A | * | 9/1926 | Millspaugh | ............... 162/360.3 |
| 5,845,375 | A | | 12/1998 | Miller et al. | |
| 6,074,480 | A | * | 6/2000 | Kakuta | ....................... 118/249 |
| 2001/0000547 | A1 | | 5/2001 | Tachauer et al. | |
| 2003/0085485 | A1 | | 5/2003 | Seidel et al. | |

FOREIGN PATENT DOCUMENTS

WO    WO 00/50226    8/2000

* cited by examiner

*Primary Examiner*—Christina Johnson
*Assistant Examiner*—Galen Hauth
(74) *Attorney, Agent, or Firm*—Fish & Richardson P.C.

(57) ABSTRACT

Method and apparatus for making fastener products (117) having molded projections (110) or other molded features carried on a surface (130) feature a transfer device (135) having an outer surface with at least one transfer area (H) relatively raised with respect to another area (L) of the outer surface of the device.

23 Claims, 13 Drawing Sheets

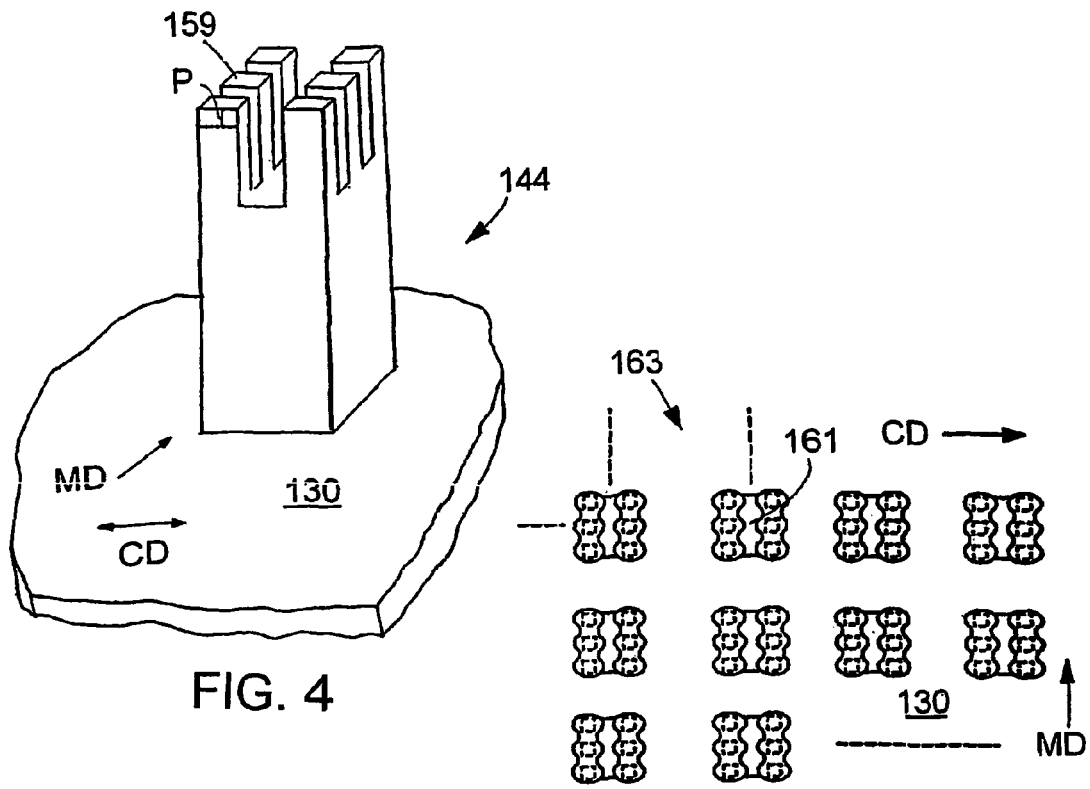
FIG. 4
FIG. 4A
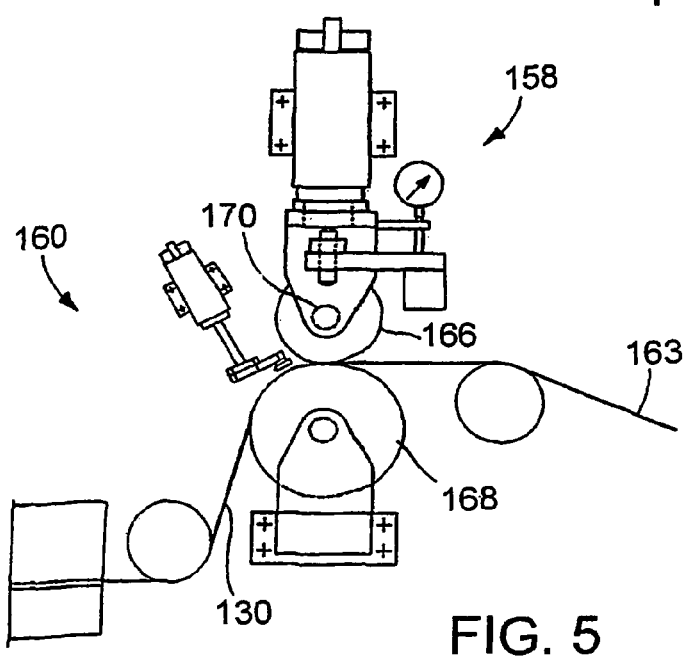
FIG. 5

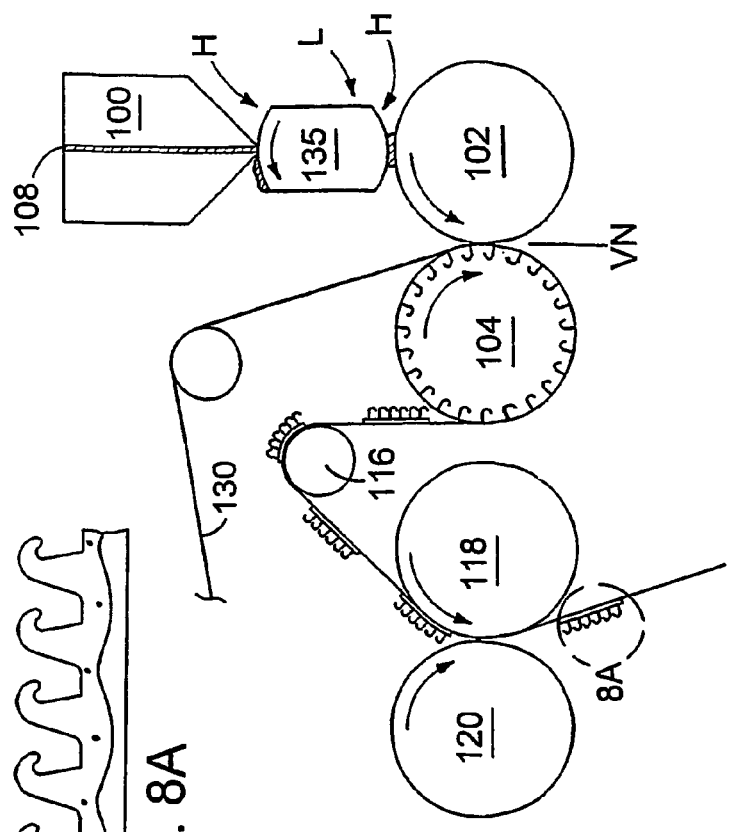
FIG. 8
FIG. 8A
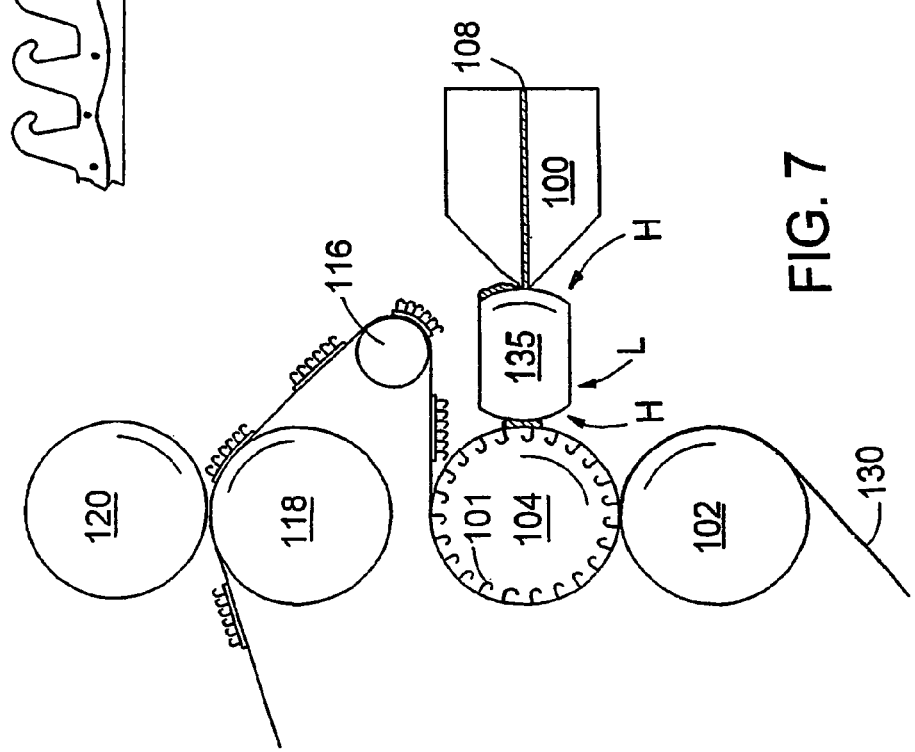
FIG. 7

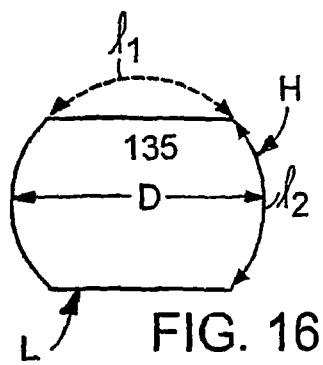
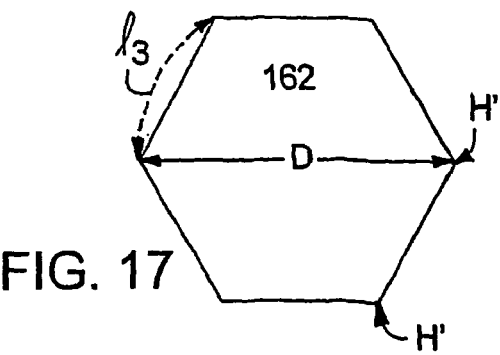
FIG. 16
FIG. 17
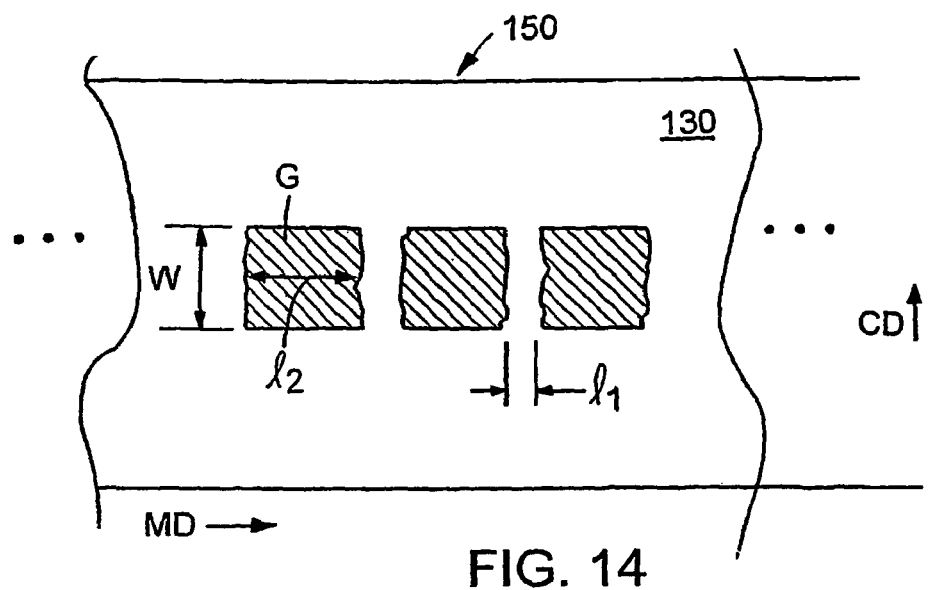
FIG. 14
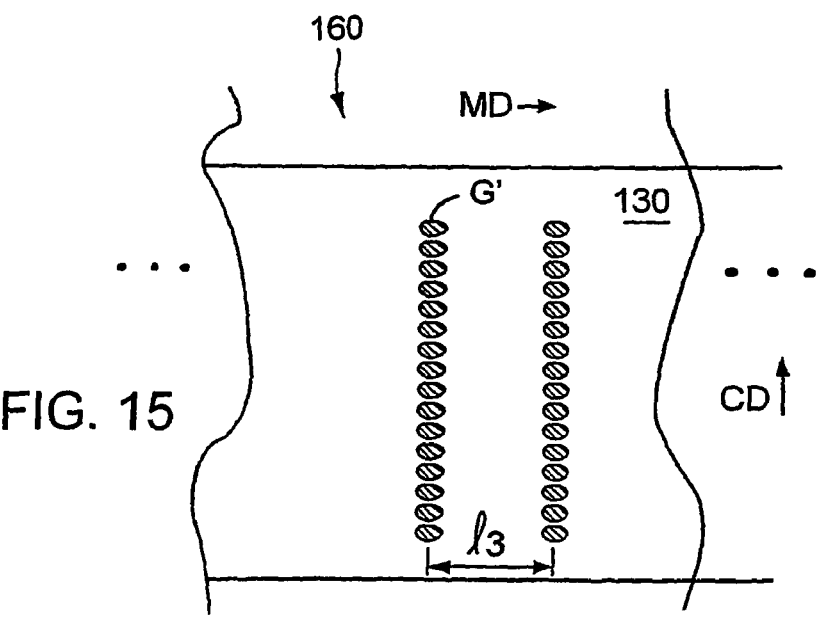
FIG. 15

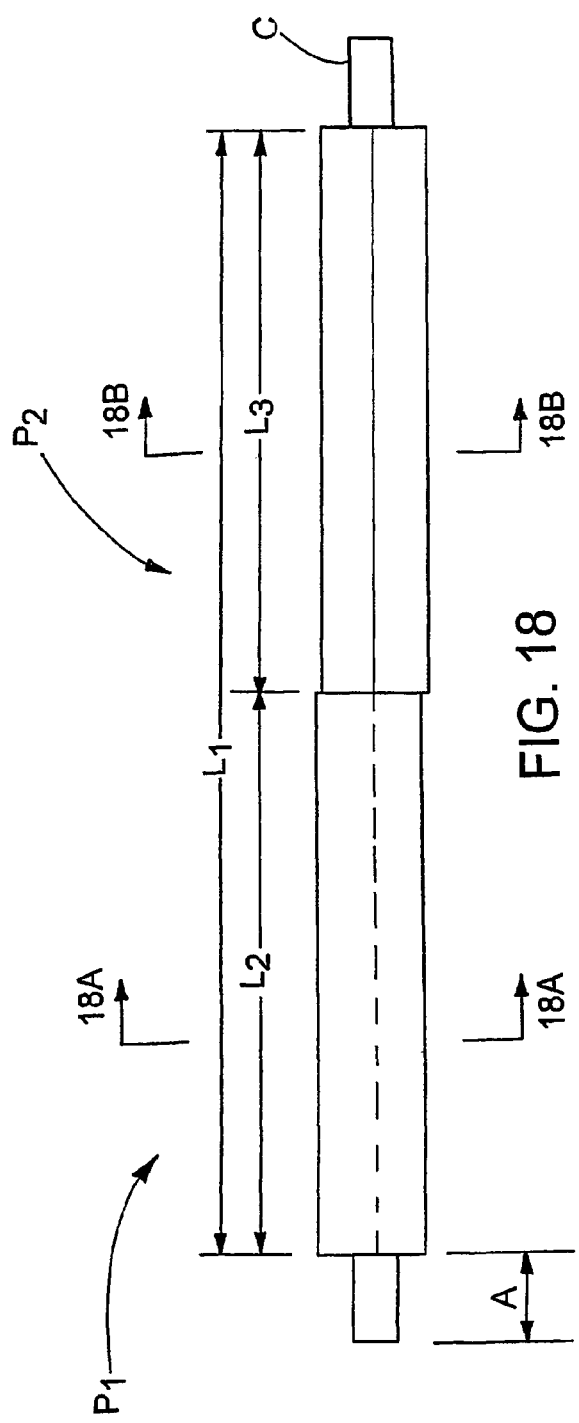
FIG. 18
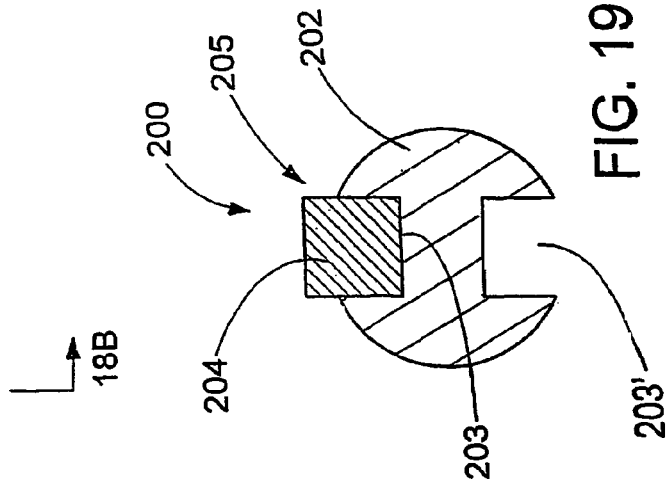
FIG. 19
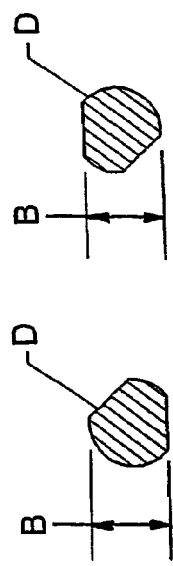
FIG. 18A
FIG. 18B

TRANSFERRING RESIN FOR FORMING FASTENER PRODUCTS

CROSS REFERENCE TO RELATED APPLICATIONS

This is a 371 US National application which claims the benefit of PCT/US2005/007646 which claims priority from U.S. Provisional Patent Application No. 60/554,234, filed, on Mar. 18, 2004, the contents of which is incorporated herein by reference in its entirety.

TECHNICAL FIELD

This invention relates to methods and machines for making fastener products.

BACKGROUND

Fastener products, such as hook components of hook-and-loop fasteners, are often manufactured by a continuous molding method employing a cylindrical mold roll which has fastener-shaped mold cavities formed in its periphery. Often the mold roll is formed of an axially compressed stack of ring-form mold plates. In operation, molten polymer from an extruder is introduced into a pressure zone in which the molten polymer is forced under high pressure into the fastener cavities of the mold roll, to mold fastener elements, e.g., hooks, or stems from which fastener elements are later formed, integrally with a base layer. In some cases the pressure zone is a nip formed by a mold roll and an adjacent pressure roll. In other configurations the pressure zone is formed between a conforming stationary pressure head and a mold roll.

For some applications, it is desirable that the fastener elements of the product be arranged only in discrete areas, and that the pattern of such areas be of a specific configuration.

Further improvements in methods and machines for making fastener products are desirable. It is desirable, for instance, that improved methods be readily and efficiently adaptable with current manufacturing methods and equipment, thus eliminating or greatly reducing the need for large expenditures in new equipment.

SUMMARY

Several aspects of the invention feature new methods and machines for making fastener products or other products having molded projections or other molded features carried on a surface, by transferring resin with a resin transfer roll having an outer surface with at least one transfer area relatively raised with respect to another area of the outer surface of the transfer roll.

One aspect of the invention features an apparatus for making fastener products having an array of male fastener elements formed of resin. The apparatus includes a mold roll that defines an array of cavities extending inwardly from its outer surface, a counter-rotating pressure roll positioned adjacent the mold roll to define a pressure nip and a rotating transfer roll for transferring moldable resin into the pressure nip in a pattern defined by the rotation of the transfer roll. The transfer roll has an outer surface with at least one transfer area relatively raised with respect to another area of the outer surface of the transfer roll. The resin is transferred into the nip in a defined region corresponding to the raised transfer area of the transfer roll.

In some implementations, the resin is transferred as a series of discrete regions spaced apart according to revolutions of the transfer roll, and in other implementations, the resin is transferred as a multiple number of regions per revolution of the transfer roll. In certain implementations, the multiple number of regions are so spaced to cause adjacent regions to merge.

In some embodiments, the transfer roll outer surface has multiple raised transfer areas and the surface includes a non-stick coating to aid in transfer of resin from transfer surface to the mold roll. The transfer areas can be spaced apart along a rotational axis of the transfer roll. In other embodiments, the transfer areas are spaced apart about a circumference of the transfer roll, such that multiple discrete regions of resin are transferred per revolution of the transfer roll.

The transfer area can include a lobe elongated along a rotational axis of the transfer roll and/or the transfer area can include a contiguous area of the outer transfer roll surface of substantially constant distance from a rotational axis of the transfer roll. In some embodiments, the transfer area includes a raised lattice surrounding discrete, recessed areas of the outer surface of the transfer roll.

In certain implementations, resin is transferred to the nip upon the surface of a mold roll. In a presently preferred embodiment, the surface speed of the transfer roll is slightly less, for example, two to five percent less, than the surface speed of the mold roll to advantageously facilitate transfer of resin to the mold roll. In some implementations, the resin is carried into the pressure nip upon a carrier sheet, for example, a foam, a film, a paper web, a polycoated paper web, or a composite web. The carrier sheet can be about the transfer roll and carried into contact with the moldable resin by rotation of the transfer roll. The transfer roll can include a vacuum source to hold the carrier sheet against the outer surface of the transfer roll.

The resin can be transferred onto the transfer roll by contact between the transfer roll and resin on a counter-rotating roll. In certain implementations, the transfer roll rotates to pick up resin on its raised transfer area from a bath of moldable resin or the transfer roll is disposed adjacent an extruder, and rotation of the transfer roll wipes resin extruded from the orifice onto the raised transfer area. The die can define multiple die orifices from which corresponding regions of resin are wiped onto the raised transfer area of the transfer roll.

Engageable heads can be formed on distal ends of the fastener element stems during the molding process, or the heads can be formed by deforming distal ends of the mold stems, after stripping the resin from the mold roll surface.

Another aspect of the invention features a method of making fastener products having an array of male fastener elements formed of resin. A mold roll that defines an array of cavities extending inwardly from its outer surface is positioned adjacent a counter-rotating pressure roll to define a pressure nip. Moldable resin is extruded at a relatively constant speed through an orifice and wiped from the orifice onto discrete transfer areas of an outer surface of a transfer roll by rotation of the transfer roll adjacent the orifice. The transfer areas are relatively raised with respect to another area of the outer surface of the transfer roll to receive the extruded resin. The wiped resin is transferred from the transfer roll for transport into the pressure nip and pressed into multiple cavities of the mold roll in the pressure nip, to form at least the stems of the fastener elements while forming a base of the resin on the surface of the mold roll. The base interconnects the fastener element stems. The resin is stripped from the mold roll surface to free the fastener product.

Another aspect of the invention features an apparatus for making fastener products. The apparatus includes a mold roll that defines an array of cavities extending inwardly from an outer surface, a counter-rotating pressure roll positioned adjacent the mold roll to define a pressure nip, and a rotatable transfer roll that transfers moldable resin into the pressure nip in a pattern defined by rotation of the transfer roll. The transfer roll has an outer surface with at least one transfer area relatively raised with respect to another area of the outer surface of the transfer roll, such that the resin is transferred into the nip in a defined region corresponding to the raised transfer area of the transfer roll.

Another aspect of the invention features an apparatus for making fastener products. The apparatus includes a mold roll that defines an array of cavities extending inwardly from an outer surface, a counter-rotating pressure roll positioned adjacent the mold roll to define a pressure nip, and a rotatable transfer device that transfers moldable resin into the pressure nip in a pattern defined by rotation of the transfer device. The transfer device has an outer surface with at least one transfer area relatively raised with respect to another area of the outer surface of the transfer device, such that the resin is transferred into the nip in a defined region corresponding to the raised transfer area of the transfer device. The transfer device can include, for example, a rubber wiper fixed to, and extending outwardly from, a rotatable transfer roll.

The new methods and machines disclosed herein are useful in making fastener products, particularly products with fastener elements arranged in only discrete regions.

It has been discovered that, under controlled conditions, applying molten resin to a moving surface that carries the resin into the forming nip, can advantageously precondition the resin for molding. The surface cooling of the resin as it is traveling into the nip, if properly controlled, can provide certain benefits while still allowing proper cavity filling. For example, some surface cooling may reduce the longitudinal orienting of polymer chains as the resin is drawn into the nip, improving longitudinal tear resistance. With moderate pre-nip cooling, some resins become less likely to strike through to the opposite face of a carrier web, for applications in which full penetration is not desirable. This can enable the use of lighter, more open materials in such processes. Furthermore, the apparatus disclosed herein can be configured for rapid reconfiguration of the resin transfer pattern, simply by replacement or modification of the transfer roll surface.

The systems and methods described herein can allow for operating at high speeds to achieve high production rates. It is noted that the faster the speed, the less the pre-delivered resin is subjected to cooling conditions of the chilled mold roll. With other conditions the same, a lower resin viscosity is achievable upon arrival at the forming nip, which can decrease the required calender pressure of the nip from that required at slower speeds.

The systems and methods described herein can also be employed to advantage in the transfer of resin in discrete regions onto a carrier web for purposes other than the formation of fastener products. For example, discrete regions with or without fastener elements can be used advantageously to alter the stretch properties of the carrier sheet.

The details of one or more embodiments of the invention are set forth in the accompanying drawings and the description below. Other features, and advantages of the invention will be apparent from the description and drawings, and from the claims.

DESCRIPTION OF DRAWINGS

FIG. 4 is a perspective view of a castellated preform fastener element.

FIG. 4A is a top view of an array of the fastener elements formed from the preforms shown in FIG. 4, after formation of nodular heads from the castellations.

FIG. 5 is a side view of a machine for heating and modifying preform fastener elements to form functional fastener elements.

FIG. 7 is a cross-sectional view of a molding stack featuring a faceted transfer roll delivering molten resin to a sheet material trained about a pressure roll.

FIG. 8 is a cross-sectional view of a calender stack with a vertical nip plane in which the transferred resin is forced through a sheet material into the mold cavities.

FIG. 8A is an enlarged view of area 8A shown in FIG. 8.

FIG. 14 is a top view of an exemplary resin transfer pattern made from the transfer roll shown in FIG. 16.

FIG. 15 is a top view of an exemplary resin transfer pattern made with a transfer roll shown in FIG. 17.

FIG. 16 is a cross-sectional view of a transfer roll with two facets separating two transfer areas.

FIG. 17 is a cross-sectional view of a transfer roll with six facets between six distinct transfer areas.

FIG. 18 is a side view of a faceted transfer roll including two sections that are offset from one another.

FIGS. 18A and 118B are cross-sectional views of the transfer roll shown in FIG. 18, taken along lines 18A-18A and 18B-188B, respectively.

FIG. 19 is a cross-sectional view of a transfer roll with a removable protrusion.

Like reference symbols in the various drawings indicate like elements.

DETAILED DESCRIPTION

Figure 1:
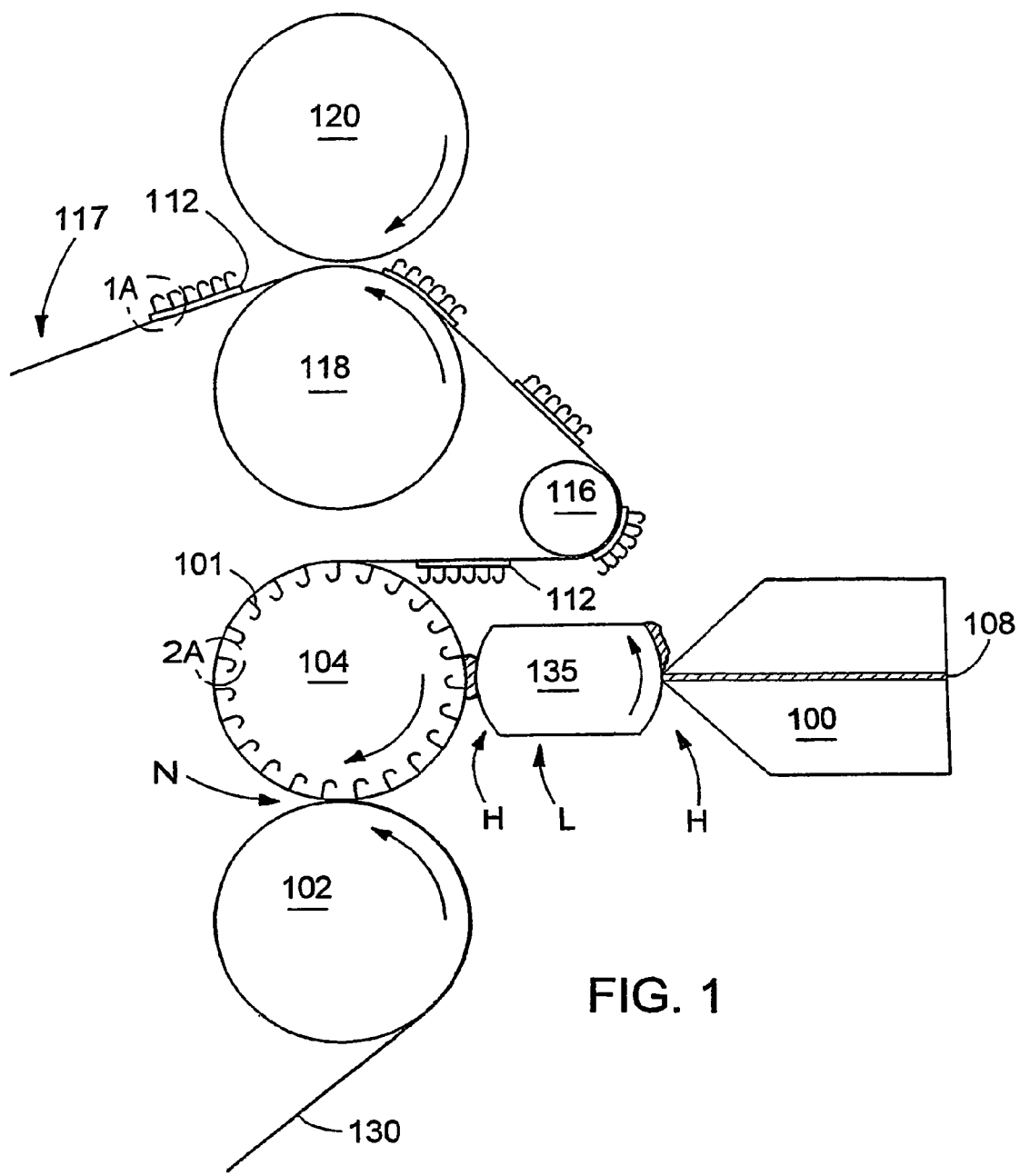
FIG. 1 is a cross-sectional view of a molding stack featuring a faceted transfer roll delivering molten resin to a mold roll.

Referring to FIG. 1, an apparatus for forming a sheet material having molded features on its surface includes an extrusion die 100 connected to an extruder (not shown) that delivers molten resin to a faceted transfer roll 135. Transfer roll 135 includes high regions H that pick up, and then deposit resin to mold roll 104, and low regions L that do not pick up resin, thus producing a series of resin deposits that are spaced apart in the production direction. A pressure nip N is formed between a rotating pressure roll 102 and a cooled, rotating mold roll 104. Sheet material 130 is introduced to the pressure nip N, into which molten resin 108 is introduced by rotation of mold roll 104. The pressure in the nip N acting on each deposit fills multiple inwardly extending cavities 101 of mold roll 104 to form fastener elements, while base 112, common to all of the fastener elements, is formed on the surface of the mold roll. The pressure and heat in the nip N laminates base 112 of the resin to sheet material 130. Stripping the fastener elements from the mold roll 104 by stripping roll 116 frees fastener product 117. Further forming action, for example, "flat-topping" of the distal ends of the fastener elements or other molded forms, can occur between rolls 118 and 120. Flat-topping is described in U.S. Pat. No. 5,953,797, the entire disclosure of which is incorporated by reference herein. Rotation direction of each roll is indicated by arrows.

Figure 1A:
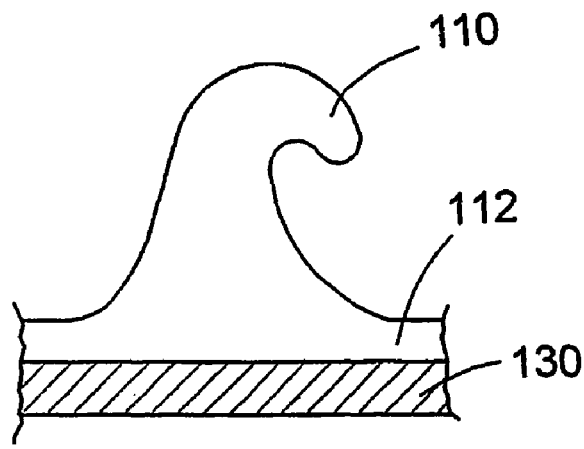
FIG. 1A is an enlarged view of area 1A shown in FIG. 1.
Figure 2A:
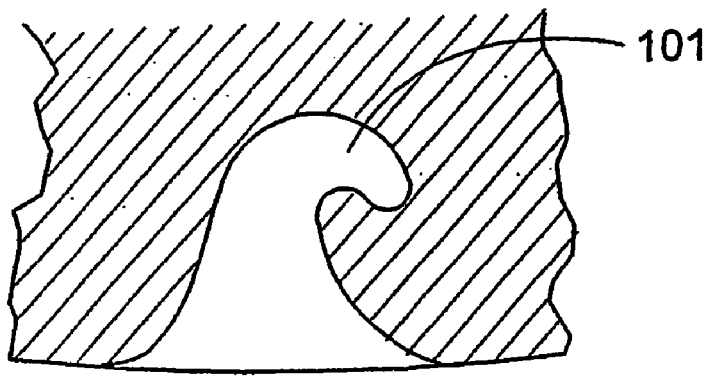
FIG. 2A is a cross-sectional view of one of the cavities of the mold roll shown in FIG. 1.
Figure 3:
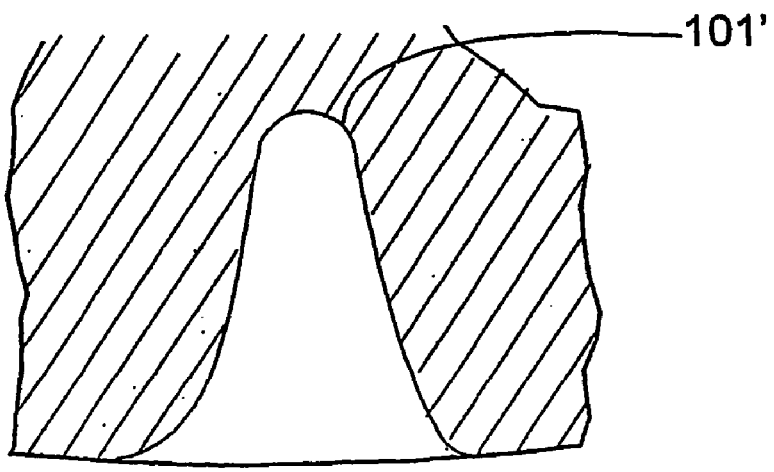
FIG. 3 is a cross-sectional view of a mold cavity shaped to form a preform fastener element.

Referring to FIGS. 1A and 2A, some fastener elements are formed in the shape of loop-engageable hooks 110 that extend outwardly from and are integral with base 112. Referring to FIG. 3, in some other embodiments, mold roll 104 includes cavities 101' in the form of preform fastener elements intended to be subjected to further forming action. Other mold cavity shapes are also envisioned. For example, FIG. 4 shows a castellated preform element 144 that can be readily molded, and then deformed by heat and/or pressure at the distal ends of its upper projections to form useful fastener elements, the heads of the resulting fastener elements shown in the fastener product top view of FIG. 4A. Further details regarding mold tooling are described in U.S. Pat. Nos. 4,775,310, 6,163,939 and 6,131,251, the entire disclosure of each is incorporated in full by reference herein.

Referring to FIGS. 4, 4A and 5, a machine 158 for forming fastener heads 161 of fastener product 163 from preformed elements 144 with projections 159 includes a heating device 160, that heats only a portion P of the projections 159, leaving the remainder of the projections relatively cool and thus relatively rigid. Portion P is heated to a softening temperature, at which time it can be formed into a desired head shape. To ensure that only portion P is heated to the softening temperature, contact or non-contact heating techniques can be employed. Heating device 160 includes a non-contact heat source, e.g., a radiant heat device or a flame, that is capable of quickly elevating the temperature of material that is very close to the heat source, without significantly raising the temperature of material that is relatively further away from the heat source. After portion P of the projections 159 has been heated, the base passes between conformation roll 166 and drive roll 168. Conformation roll 166 forms the portion P of the stems into a desired head shape, while drive roll 168 advances the base and flattens it against roll 166 to enhance head uniformity. Generally, to obtain the desired forming temperature it is advantageous to chill the conformation roll, e.g., by running cold water through a channel 170 in the center of the roll. Additional details regarding this process are described in U.S. patent application Ser. No. 10/455,240 and U.S. Pat. No. 6,248,276, the entire disclosure of each of which is hereby incorporated by reference herein.

Figure 6A:
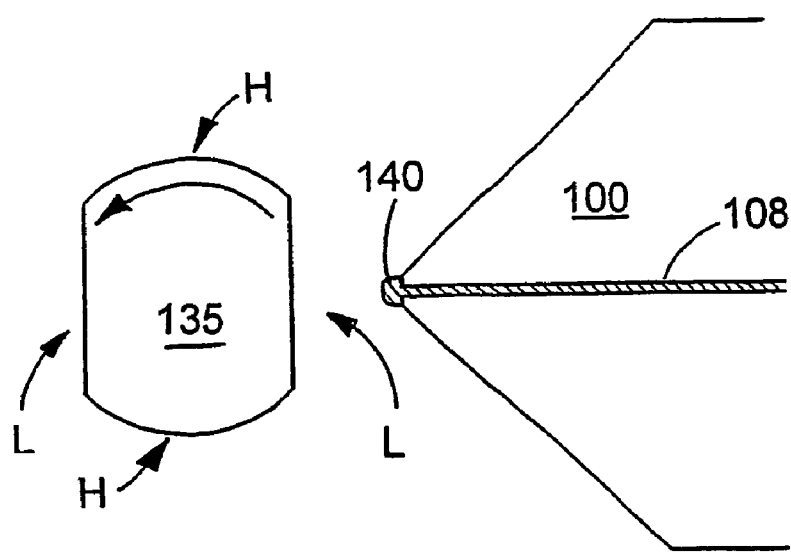
FIGS. 6A-6B are diagrammatic cross-sectional views of a faceted transfer roll and die, illustrating transfer of resin from the die to the transfer roll.
Figure 6B:
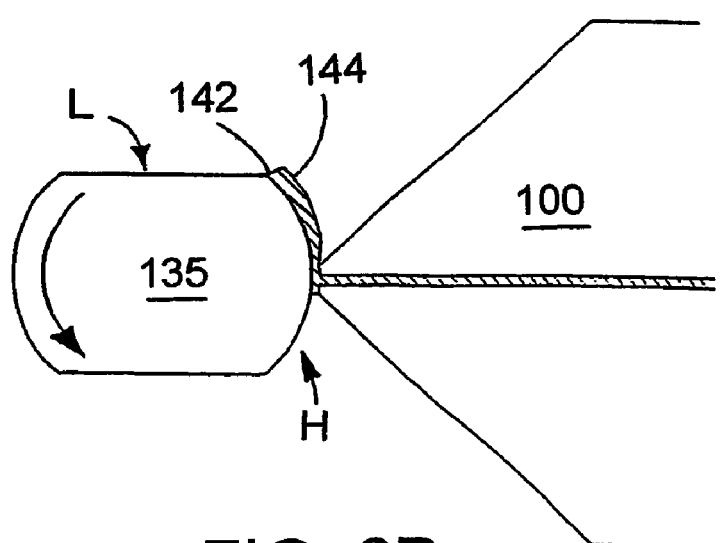

Referring now to FIGS. 6A and 6B, the surface of faceted transfer roll 135 has two low regions L, and two high regions H. As the low region on transfer roll 135 passes in front of the die 100, molten resin 108 accumulates as bolus 140 at the lips of die 100. Leading edge 142 of a high region H initiates removal of a bolus 140, the resin of which is smeared onto the high region of the mold roll. Further extrusion from the die lip during traversal of high region H may continue to apply resin to the transfer roll, as shown, depending on the proximity of the roll surface to the die orifice and the extrusion rate, among other factors.

In some implementations, the faceted transfer roll is heated, and in other implementations, it is cooled, the selected thermal condition depending upon the properties of the resin selected to be transferred, and the desired effect. In some instances, the faceted transfer roll, for example, is metal and in other instances, when, for example, it is wished to inhibit heat transfer and adhesion to the transfer roll, the roll or its outer surface is of adhesion-resistant material, for instance silicone rubber or a fluoropolymer. Faceted transfer rolls can be fabricated by machining flat facets on circular cross-section stock. Among various embodiments, the number of facets, for example, range from one to about 10 or more, depending upon the size of the transfer roll and the desired size of the deposits and spacing between them, and the facets may extend axially continuously, to form bands of resin, or be interrupted selectively to form islands.

Figure 6C:
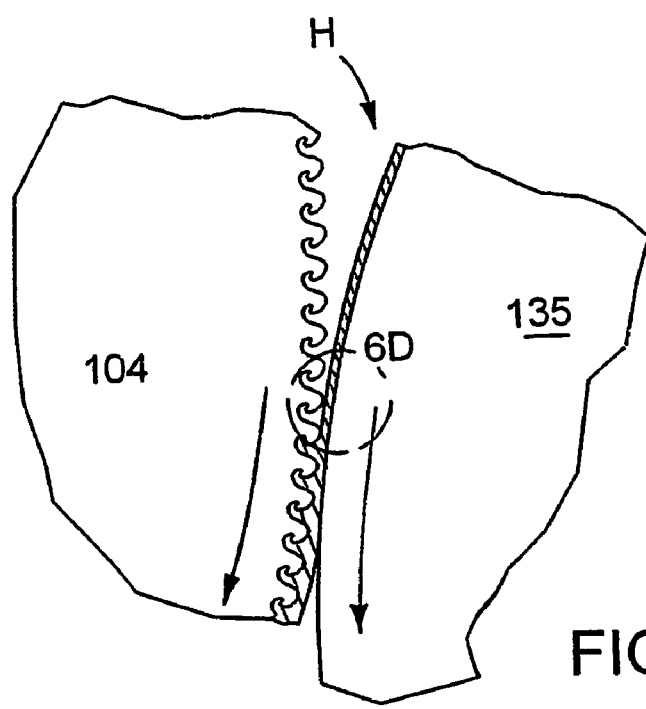
FIG. 6C is an enlarged cross-sectional view of a portion of the faceted transfer roll of FIG. 6A delivering molten resin to the mold roll.
Figure 6D:
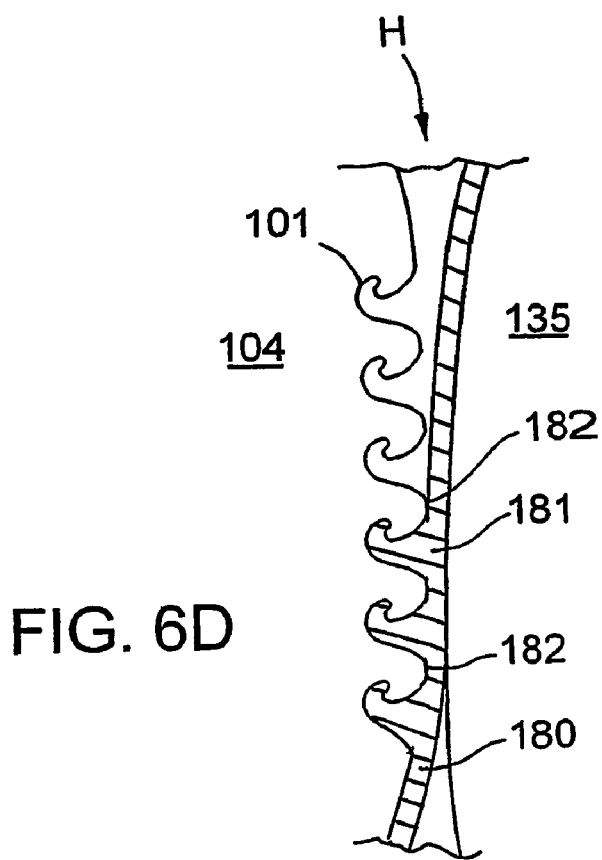
FIG. 6D is an enlarged view of area 6D shown in FIG. 6C.

Referring to FIGS. 6C and 6D, transfer of resin from faceted transfer roll 135 to mold roll 104 is assisted by the open mouths of open mold cavities in mold roll 104. The cavities provide a functional degree of effective roughness or "graspiness" to the surface of mold roll 104, aiding in the separation of the resin from transfer roll 135. It is not desired that the transferred resin fill the cavities at this point, only that it securely cling to the surface of the mold roll.

With respect to applying the resin in advance of application of molding pressure, it is realized that the low thermal conductivity of the molten resin, the limited duration of contact of the resin with the mold roll surface between point of resin delivery and point of application of nip pressure, and the insulating quality of the air-filled mold cavities themselves combine to enable the successful later filling of the mold cavities with the applied resin. Thus, we find it unnecessary, given the techniques described herein, to deliver molten resin directly to the mold nip, or to the cavities under substantial pressure. The transferred resin 180 in regions 182 is subjected to a higher rate of cooling than the resin in regions 181 because regions 182 are in direct contact with the surface of the mold roll between adjacent cavities, whereas regions 181 have reduced thermal transfer characteristics because cavities 101 are filled with insulating air. This causes surface resin in regions 182 to be more solidified when entering the nip and therefore more resistant to shear flow and longitudinal polymer orientation. This can result in a fastener product with a lower tendency for tear propagation in the machine or production direction. Even so, it is presently preferred to position the point of application of the resin such that the resin is exposed to cooling for a time less than about 0.5 seconds before entering the nip, preferably less than about 0.1 second. At preferred line speeds, the point of application of the resin is spaced from the nip a distance of less than about 10 inches (25.4 cm), preferably less than 5 inches (12.7 cm). The presently preferred surface speed of the mold roll is at least 150 feet per minute, preferably more than 250 feet per minute (45.7-76.2 m/min).

Referring back to FIG. 1, the transferred resin is introduced to a sheet material 130 in the nip. The sheet material can be a woven, non-woven, or a knit material. The sheet material can also be a foam, a film, a paper web, a polycoated paper web, or a composite web, such as webs that include one or more elastomeric films. The parameters of the process can be selected to advantageously deliver partially solidified resin to the nip. This can be particularly useful with relatively open materials (e.g., fabrics) to lessen the tendency for excessive penetration of the resin into the material and to prevent strike-through of resin through the complete thickness of the material. Thus, a textile sheet material to which molded formations are laminated can more closely retain its original properties, while using less resin.

In particular examples, the above technique is advantageously employed to apply molded features upon thin, spun bonded fabrics that heretofore have not been considered suitable to process for many end products. This is important since products, in many fields, such as personal care products, medical sheets used for wrappings, clothing, and drapes, thinner, it is desired to have thinner, less expensive and more pliant webs. The integrity of the molded base layer can enable the application of substantial demold forces even where very thin materials serve as a backing. Retention of the integrity of the resin base layer under neighboring hooks helps ensure that the layer has sufficient strength to enable demolding of complex shapes. In this manner hooks having highly aggressive profiles and preform stems of complex shape that resist demolding can be formed onto thin and relatively weak substrate materials.

Allowing the resin to cool slightly as it travels on the mold roll surface before entering the nip, reduces the overall exposure of the sheet material to hot molten resin. Heretofore, many sheet materials for in-situ lamination were restricted to relatively expensive polyesters or other temperature-resistant resins. The methods described herein can enable the use of lower cost materials or strands as supporting material, such as those formed of fibers of polypropylene, polyethylene or blends, in place of temperature resistant resins such as polyester.

Referring now to FIG. 7, rather than resin being transferred by transfer roll 135 directly to the mold roll, it can be delivered directly to sheet material 130 that is trained about pressure roll 102. In some implementations, the insulating properties of the sheet material 130 can be advantageously used to deliver resin that is solidified at the sheet material/resin interface, but is molten above that so that the pressure of the nip can fill the cavities of the mold roll. This type of delivery system can be used to produce fastener products that show a lesser tendency for rip propagation in the production direction due to less longitudinal orientation of the solidified resin at the material/resin interface.

Referring to FIG. 8, a molding stack with a vertical nip plane $V_N$ is shown and illustrates that rather than resin being transferred by transfer roll 135 directly to mold roll 104, it can be delivered directly to pressure roll 102, and then by rotation of the pressure roll delivered to the nip N. In this embodiment, the sheet material is a relatively porous type of material (e.g., a scrim material) such that when the molten resin and the sheet material come together in the nip N, the pressure therein forces the resin completely through the sheet material to mold fastener elements on the other side. A cross-sectional view of the resulting fastener product is shown in FIG. 8A. Such porous sheet materials are described in U.S. patent application Ser. No. 10/688,301, the entire disclosure of which is hereby incorporated by reference herein.

Figure 9B:
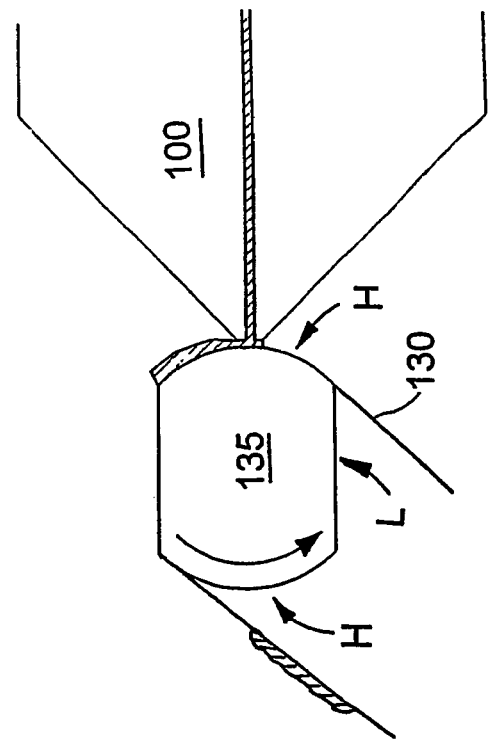
FIGS. 9A and 9B sequentially illustrate a die delivering resin to a sheet material trained about a faceted roll.
Figure 9A:
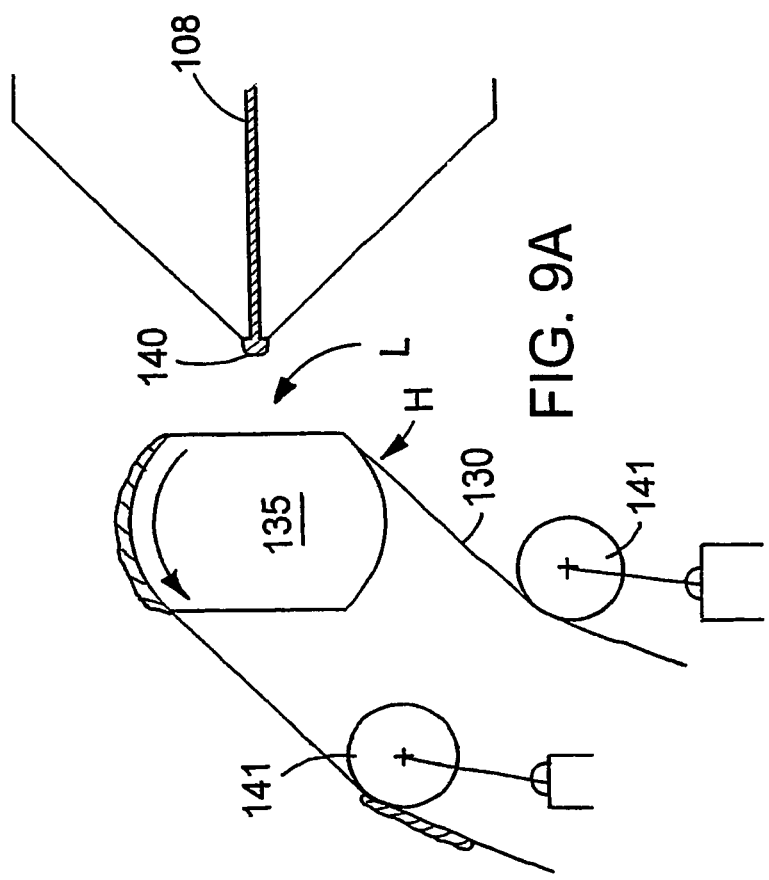

Referring to FIGS. 9A and 9B, molten resin is be delivered directly to a sheet material 130 that is trained about faceted transfer roll 135. As the low region on transfer roll 135 passes in front of die 100, molten resin 108 accumulates as bolus 140 at the lips of die 100. The leading edge of a high region H that is under sheet material 130 initiates removal of a bolus 140, the resin of which is smeared upon the sheet material as the high region H passes in front of die 100. Further extrusion from the die lip during traversal of high region H may continue to apply resin to the sheet material, as shown, to an extent, depending on the proximity of the sheet material to the die orifice and the extrusion rate, among other factors. A pair of dancers 141 are utilized to compensate for path length changes that result from rotation of faceted transfer roll 135.

Figure 10:
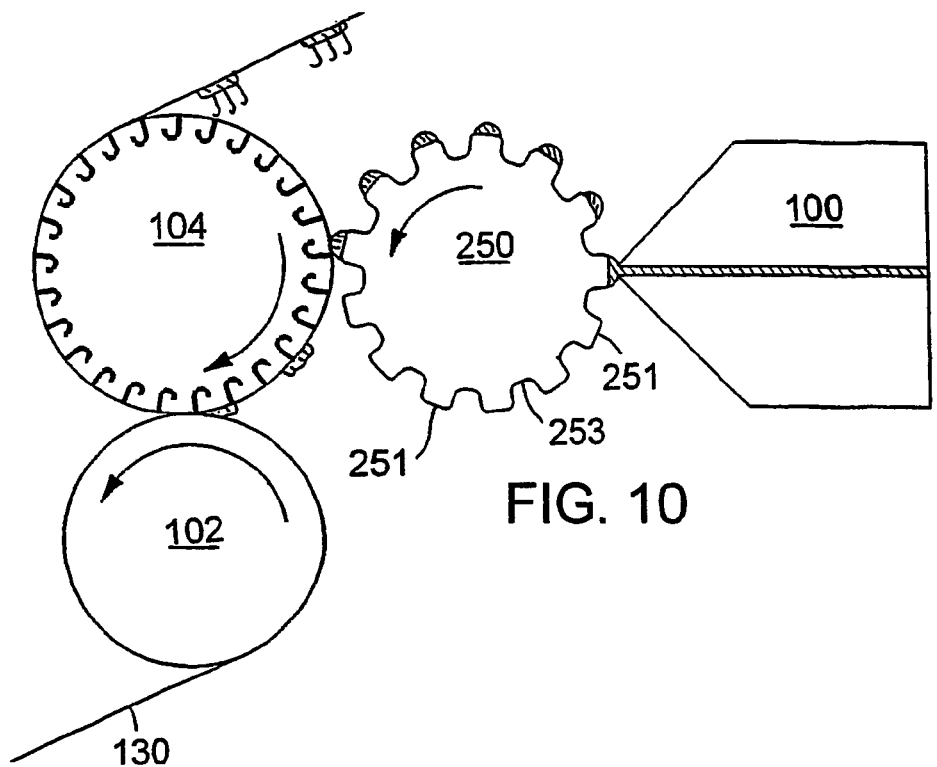
FIG. 10 shows sprocket-shaped transfer roll delivering molten resin directly to a mold roll.

FIG. 10 illustrates a sprocket-shaped transfer 250 roll with high regions 251 and low regions 253. As transfer roll 250 rotates in front of die 100, high regions 251 that are relatively raised with respect to low regions 253 collect molten resin from the lips of die 100, and then by rotation of transfer roll 250 deliver the molten resin to mold roll 104. Molten resin is carried upon the mold roll and delivered to nip N by rotation of the mold roll. Fastener elements, or other desired features, are molded in the nip upon sheet material 130 in the fashion discussed above. In certain embodiments, the profile of the transfer roll remains the same throughout the axial length, or over selected extended regions, and the extruder die is correspondingly shaped to deliver resin only where the transfer roll is effective.

In other embodiments, the sprocket-shaped transfer roll includes sprocket-shaped transfer discs of selected thickness assembled alternately with spacer discs of a selected thickness and of lesser diameter. Relatively narrow die orifices are provided to furnish molten resin bands of width generally corresponding to the thickness of the transfer discs. Other embodiments described above, are likewise subject to this variation.

Figure 11:
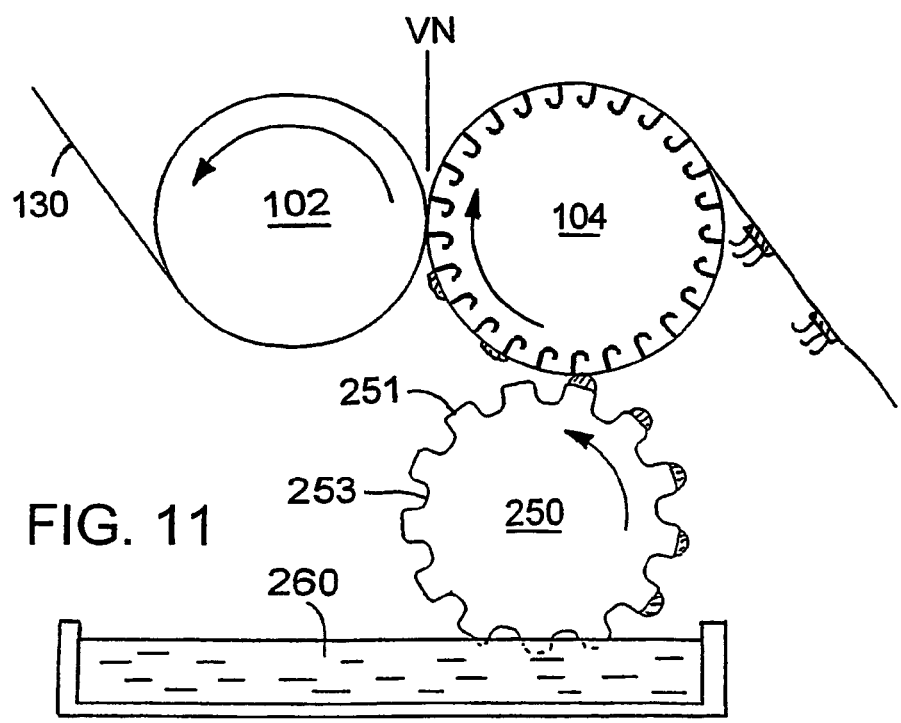
FIG. 11 shows a sprocket-shaped transfer roll collecting molten resin from a reservoir and delivering the molten resin directly to the mold roll.

Referring now to FIG. 11, a reservoir 260 of molten plastic is used in place of an extruder to deliver molten resin to sprocket-shaped transfer roll 250. As transfer roll 250 rotates, high regions 251 that are relatively raised with respect to low regions 253 collect molten resin from reservoir 260, and deliver the molten resin to mold roll 104. In some embodiments, it is advantageous to use a low viscosity resin. Suitable low viscosity resins are those with a melt-flow rate (MFR), as determined by ASTM test method D1238, the entire disclosure of which is hereby incorporated by reference herein, of greater than about 5 g/10 min., e.g., 6, 7, 10, 15, 20, 25 or more, e.g., 30 g/10 min.

Figure 12:
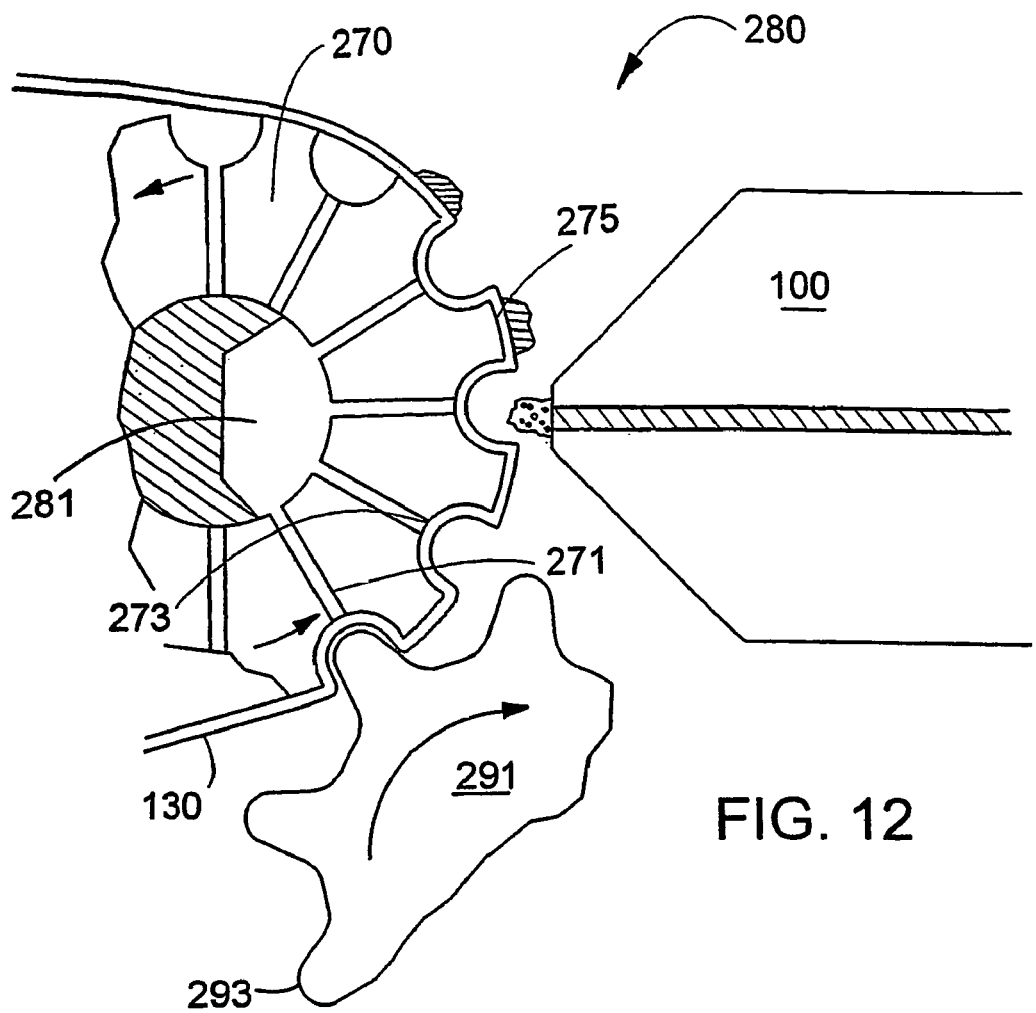
FIG. 12 is a cross-sectional view of a portion a transfer roll in which a vacuum manifold pressure draws a trained sheet material against the roll surface during resin application.

Referring to FIG. 12, transfer roll 280 includes a rotatable portion 270 and a central stationary vacuum manifold portion 281 that is generally oriented in the direction of delivery die 100. The rotatable portion 270 includes a plurality of vacuum channels 271 that terminate inwardly near the central manifold and outwardly at the valleys of low regions 273 of the transfer roll. Geared to transfer roll 280, is a complementary sprocket 291 that is sized and dimensioned so that raised teeth 293 push the sheet material 130 into the valleys 273 of transfer roll 280. As each section of the rotatable portion 270 with the sheet material trained about it nears die 100, the teeth 293 of roll 291 push the sheet material into valleys 273, while the channels 271 become open to evacuated manifold portion 281, drawing the sheet material tightly against transfer roll 280, conforming the sheet material to the high and low regions of the transfer roll. The high regions 275 collect molten resin from die 100. As the web with the resin upon moves away from the die, the channels are shut off and the vacuum released, allowing the sheet material to be pulled away from the transfer roll 280. In a particular implementation, the channels are circular in transverse cross-section. The pumping requirement of the vacuum system can be selected in relation to the degree of air impermeability of the sheet material being processed.

Figure 13:
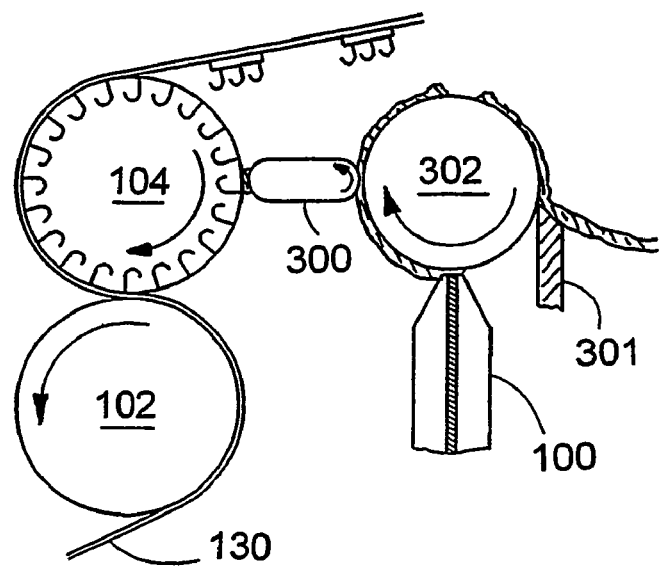
FIG. 13 is a cross-sectional view of a portion of a calender stack featuring delivering molten resin to a faceted transfer roll from an adjacent, counter-rotating roll, and then delivering the molten resin on the faceted transfer roll to the mold roll.

Referring to FIG. 13, in another embodiment, faceted transfer roll 300 has rounded edges when compared to transfer roll 135 of FIG. 1, and molten resin is delivered to transfer roll 300 from an adjacent, counter-rotating non-faceted transfer roll 302. Resin not transferred to transfer roll 300 is removed by scrapper 301. This embodiment can increase the resin cooling time when that is desirable.

Referring to FIGS. 14 and 16, the fastener product 150 of FIG. 14 is produced using faceted transfer roll 135 of FIG. 16. Regions G of molten resin 108 are delivered from a single channel die opening (not shown) of width corresponding to transverse width W of the resin deposit G. The length $l_2$ of the resin deposit in the machine direction (MD) is determined by the circumferential distance $l_2$ of the raised delivery surface H of the faceted transfer roll 135. The length $l_2$ can be made larger by increasing the diameter D of roll 135. The distance l between resin regions G is determined by the circumferential span $l_1$ of the facet. The fastener product 160 of FIG. 15 is produced using faceted tool roll 162 of FIG. 17. Rows of regions G' are created by delivering molten resin from a die with sixteen discrete, transversely spaced apart orifices that are 0.050 inch (1.27 mm) wide and 0.015 inch deep (0.38 mm). In one example, the spacing between adjacent orifices is 0.063 inch (1.60 mm). Each corner of hexagonal transfer roll 162, serves as a high point H' to transfer a discrete bolus of resin. The spacing $l_3$ of the deposits in the machine direction (MD) is determined by the arc span distance $l_3$ of each facet of the transfer roll 162. If the sheet material 130 upon which the molded features are laminated is a width-wise stretchy material, the product can have excellent stretch properties in the cross-machine direction (CD) due to the stretchiness of the material in the open spaces between adjacent resin deposits G' in each row. The transfer roll and the die orifice may be configured, and the extrusion rate selected such that the individual deposits of resin within any transverse row and in any column in the machine direction are sufficiently close together to be merged at the nip. We have found that large patches of resin can be formed with very predictable and controllable shapes by depositing multiple, relatively small amounts of resin in an array within the patch, such that the discrete deposits are merged under nip pressure to cover the patch. In this manner, the transferred resin is more uniformly distributed across the patch, and any tendency for the overall patch dimensions and shape to be affected by lateral forces in the nip is reduced.

Referring to FIG. 18, the length $L_1$ of a faceted transfer roll, or roll segment ranges from about 1 inch to about 36 inches (2.54-91.44 cm) or more depending upon the desired effect. Referring again to FIGS. 16 and 17, the diameter D of faceted transfer roll 135 or 162 ranges from, for example, about ¼ inch to 10 inches or more (0.64-25.4 cm). In some implementations, a faceted transfer roll can advantageously has portions $P_1$ and $P_2$ with different numbers of facets to provide varied pattern. For example, a faceted tool roll with a portion with length $L_2$ can include two facets like that of FIG. 16, and a portion with length $L_3$ can include six facets like that of FIG. 17. Referring to FIGS. 18-18B, in a particular embodiment, a faceted tool roll has an overall length $L_1$ of 11.25 inch. The length A of the rotational shaft C is 0.75 inch (1.91 cm). This particular embodiment has two equal portions with a length $L_2=L_3$ of 5.625 inch (14.29 cm). Cut into each transfer roll segment is two facets. The distance between a facet face and the exterior of the transfer roll B is 0.767 inch (1.95 cm). The diameter D of the transfer roll is 0.830 inch (2.11 cm) and the diameter of the rotational shaft C is 0.375 inch (0.95 cm). In this particular embodiment, although each portion is eccentric in that the center of mass for that portion does not coincide with the rotational axis of the transfer roll, each portion is rotated relative to the other so that the entire transfer roll is balanced with the center of mass coinciding with the rotational axis of the transfer roll.

Figure 20:
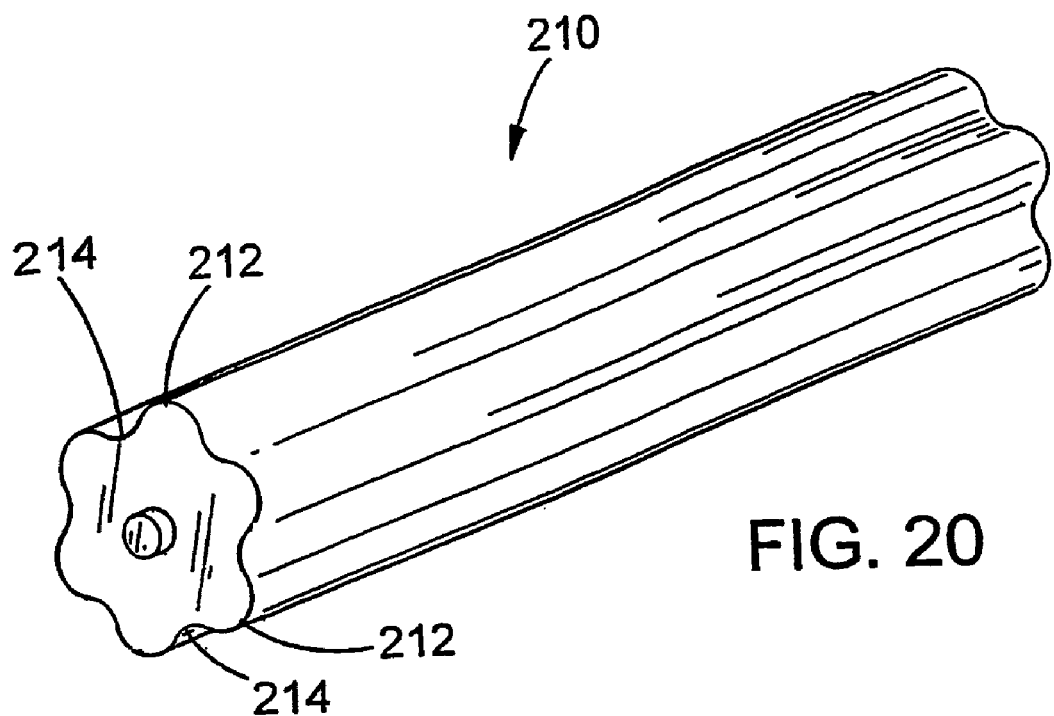
FIG. 20 is a perspective view of a transfer roll with six discrete lobes.
Figure 21:
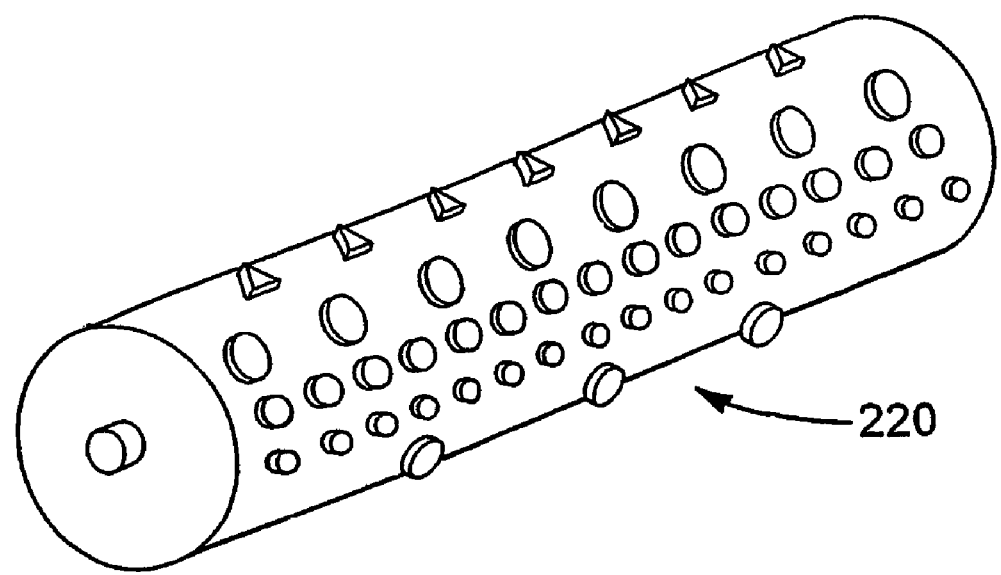
FIG. 21 is a diagrammatic perspective view of a transfer roll illustrating a plurality of discrete projections of various shapes.

Other embodiments for the transfer roll are possible. For example, referring to FIG. 19, a transfer roll 200 includes a cylindrical body 202 with longitudinal slot 203 and 203'. A key 205 is sized to fit into the longitudinal slit 203 such that a transfer area 204 is relatively raised with respect to other areas of the outer surface of the transfer roll. Resin is transferred onto to the tool roll 104 by the raised transfer area 204 in a fashion similar to that described above. In another use, the pattern is varied by entering another key in slot 203'. Numerous additional slots may likewise be provided in roll 200. Referring to FIG. 20, in another embodiment, transfer roll 210 includes longitudinal transfer lobes 212 that are higher than the adjacent longitudinal valleys 214. In a fashion similar to that described above, resin is transferred upon the tool roll 104 by the raised transfer lobes 212. Referring to the diagrammatic view of FIG. 21, in still another embodiment, transfer roll 220 includes one or a variable selection of projections extending outwardly from a cylindrically-shaped base. As illustrated, the projections can be, for example, circular in cross-section or triangular in cross-section. In a similar manner as described above, the projections represent transfer surfaces, being relatively raised with respect to other areas.

In certain implementations, the turn rate of the transfer roll is associated with a speed control device which functions independently of the speed of rotation of the mold roll 104 so that the surface speed of the transfer roll may be equal to, faster than, or slower than the surface speed of the mold roll. This allows for design flexibility in the final product. For example, a differential speed can be maintained to cause the material to smear the deposit of resin onto a surface to obtain a particular shaped deposit. In a presently preferred embodiment, the surface speed of the transfer roll is slightly less, for example, 2-5% less, than the surface speed of the mold roll to advantageously facilitate transfer of resin to the mold roll.

Figure 22A:
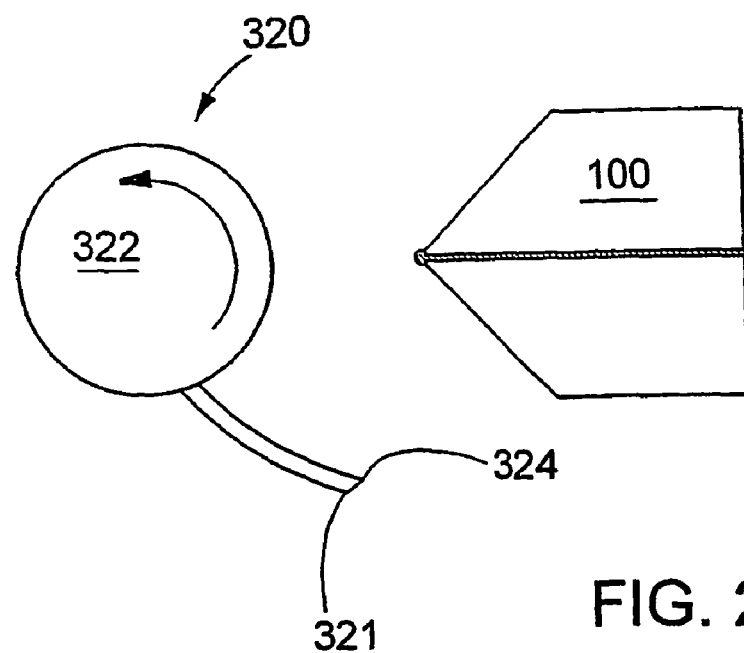
FIGS. 22A and 22B sequentially illustrate a die delivering resin to a transfer device that includes a rubber wiper.
Figure 22B:
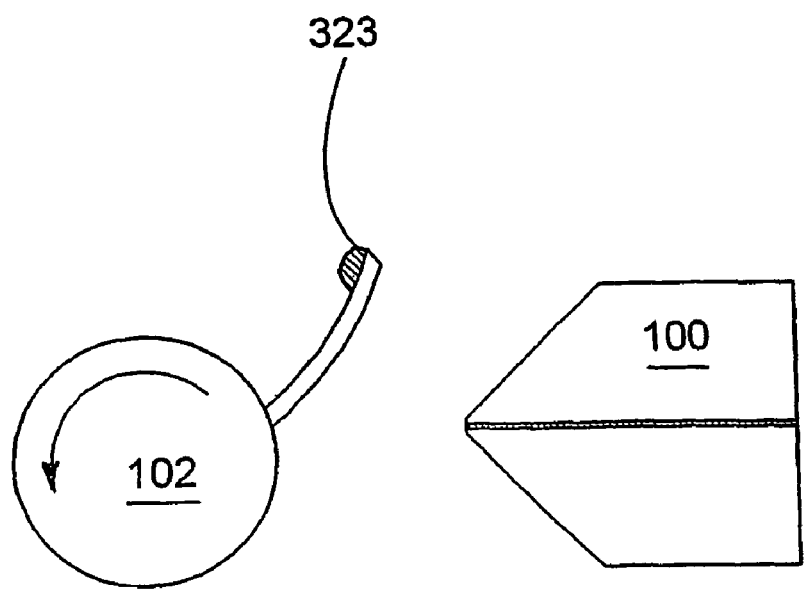

Referring now to FIG. 22A, a rotatable transfer device 320 includes a rotatable transfer roll 322 with an outer surface carrying a wiper 321, e.g., a rubber wiper, fixed to, and extending outwardly from, the rotatable transfer roll. The transfer device has an outer surface with at least one transfer area relatively raised with respect to another area of the outer surface of the transfer device, such that the resin is transferred into the nip in a defined region corresponding to the raised transfer area of the transfer device. Referring now to FIGS. 22A and 22B, leading edge 324 of wiper 321 initiates removal of a bolus of resin. The bolus of resin 323 upon wiper 321 is smeared onto the mold roll, as discussed above.

A number of embodiments of the invention have been described. Nevertheless, it will be understood that various modifications may be made without departing from the spirit and scope of the invention. For example, while the transfer plane of the molding stack shown in FIG. 1 is horizontal, it can be vertical such that gravity assists in the removal of the molten resin. The point of delivery of the molten resin in any of the embodiments described above can be different than shown in the figures. For example, the molten resin being delivered to the tool roll shown in FIG. 1 can be delivered closer or further away from the nip N. Molten resin can be transferred to the transfer roll by a die that includes a rotating die wheel that delivers discrete doses of resin. Such rotating die wheels are described in a patent application filed concurrently herewith, entitled "Delivering Resin for Forming Fastener Products," and assigned U.S. Ser. No. 10/803,682, the entire contents of which is incorporated by reference herein. Accordingly, other embodiments are within the scope of the following claims.

What is claimed is:

1. A method of making fastener products having an array of male fastener elements formed of resin, the method comprising:
    providing a mold roll defining an array of cavities extending inwardly from an outer surface thereof, the mold roll positioned adjacent a counter-rotating pressure roll to define a pressure nip;
    transferring moldable resin into the pressure nip in a pattern defined by rotation of a transfer roll having an outer surface with at least one transfer area relatively raised with respect to another area of the outer surface of the transfer roll, such that the resin is transferred into the nip in a defined region corresponding to the raised transfer area of the transfer roll;
    laminating the moldable resin to a carrier sheet;
    pressing the region of resin into multiple cavities of the mold roll in the pressure nip to form at least the stems of the fastener elements, while forming a base of the resin on the surface of the mold roll, the base interconnecting the fastener element stems; and
    stripping the resin from the mold roll surface on the carrier sheet;
    wherein the resin is transferred into the pressure nip by first being transferred from the outer surface of the transfer roll to an outer surface of at least one of the mold roll and the pressure roll, and then carried into the pressure nip by rotation of the roll receiving the resin.

2. The method of claim 1, wherein the resin is transferred as a series of discrete regions spaced apart according to revolutions of the transfer roll.

3. The method of claim 1, wherein the resin is transferred as a multiple number of regions per revolution of the transfer roll.

4. The method of claim 3, wherein the multiple number of regions are so spaced to cause adjacent regions to merge.

5. The method of claim 1, wherein the transfer roll outer surface has multiple raised transfer areas.

6. The method of claim 1, wherein the outer surface includes a non-stick coating to aid in transfer of resin from transfer surface to the mold roll.

7. The method of claim 5, wherein the transfer areas are spaced apart along a rotational axis of the transfer roll.

8. The method of claim 5, wherein the transfer areas are spaced apart about a circumference of the transfer roll, such that multiple discrete regions of resin are transferred per revolution of the transfer roll.

9. The method of claim 1, wherein the transfer area comprises a lobe elongated along a rotational axis of the transfer roll.

10. The method of claim 1, wherein the transfer area comprises a contiguous area of the outer transfer roll surface of substantially constant distance from a rotational axis of the transfer roll.

11. The method of claim 1, wherein the transfer area comprises a raised lattice surrounding discrete, recessed areas of the outer surface of the transfer roll.

12. The method of claim 1, wherein a surface speed of the transfer roll and the mold roll are substantially the same.

13. The method of claim 1, wherein the carrier sheet is trained about the transfer roll and carried into contact with the moldable resin by rotation of the transfer roll.

14. The method of claim 1, including supplying vacuum pressure to hold the carrier sheet against the outer surface of the transfer roll.

15. The method of claim 14, including porting the vacuum pressure to multiple recessed areas of the outer surface of the transfer roll between raised transfer areas.

16. The method of claim 1, wherein the moldable resin is applied directly to the outer surface of the transfer roll in the raised transfer area.

17. The method of claim 1, wherein the resin is transferred into the pressure nip by first being transferred from the outer surface of the transfer roll to the outer surface of the mold roll, and then carried into the pressure nip by rotation of the mold roll.

18. The method of claim 1, wherein the resin is transferred into the pressure nip by first being transferred from the outer surface of the transfer roll to an outer surface of the pressure roll, and then carried into the pressure nip by rotation of the pressure roll.

19. The method of claim 1, wherein the transfer roll rotates to pick up resin on its raised transfer area from a bath of moldable resin.

20. The method of claim 1, wherein resin is transferred onto the transfer roll by contact between the transfer roll and resin on a counter-rotating transfer roll.

21. The method of claim 1, further comprising forming engageable heads on distal ends of the fastener element stems.

22. The method of claim 1, wherein the mold roll cavities arc shaped to mold the engageable heads.

23. The method of claim 1, wherein the resin is laminated to the carrier sheet by pressure in the pressure nip.

* * * * *